W. P. DUN LANY.
SPEED REGULATOR AND BRAKE FOR TALKING MACHINES.
APPLICATION FILED OCT. 23, 1916.
1,284,184.
Patented Nov. 5, 1918.
2 SHEETS—SHEET 1.
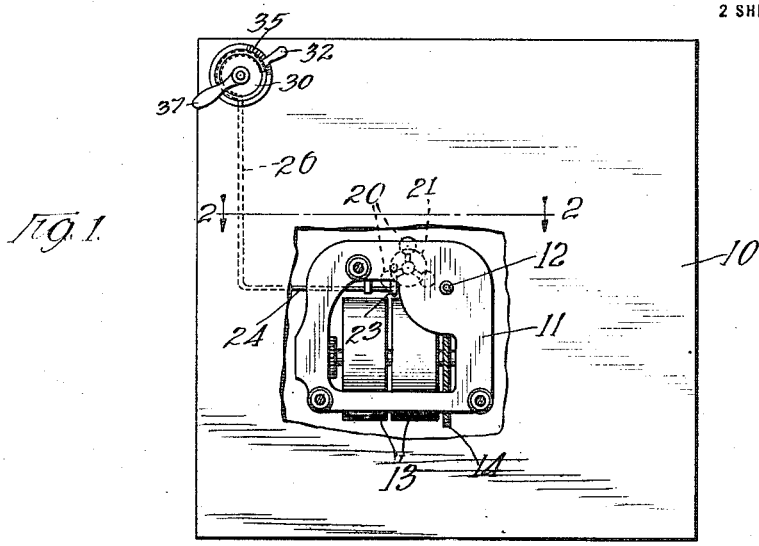
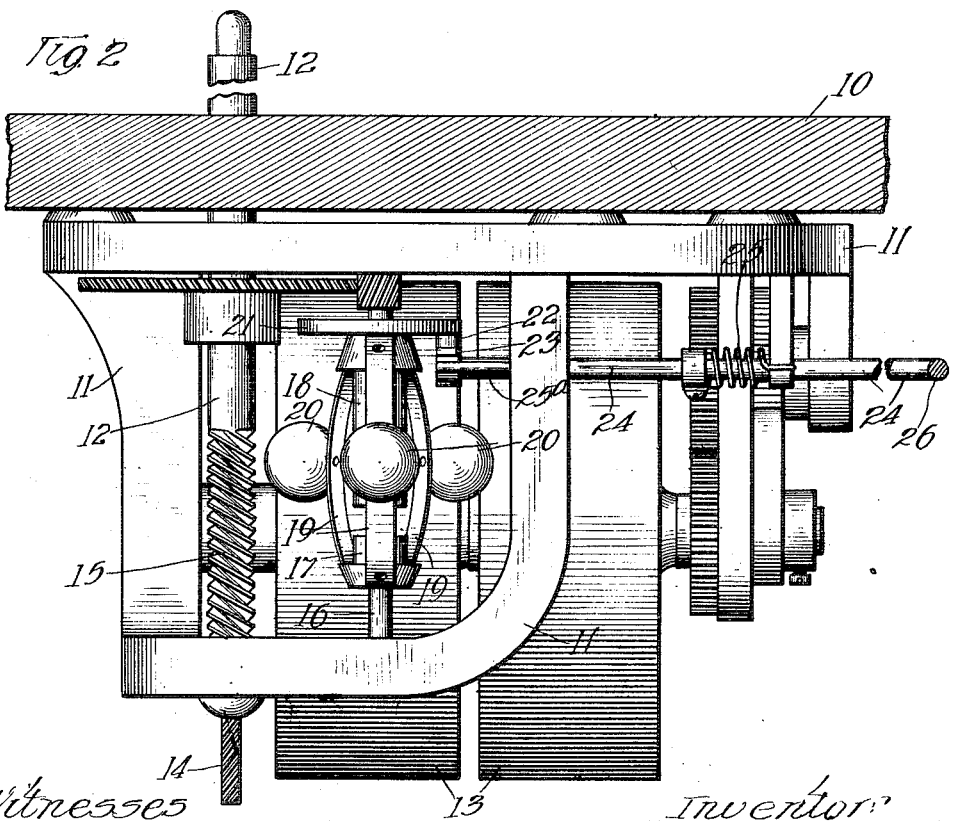
Witnesses
W. F. Kilroy
Harry R. L. White
Inventor
William P. Dun Lany
By Miller Chindahl & Parker
Att'ys

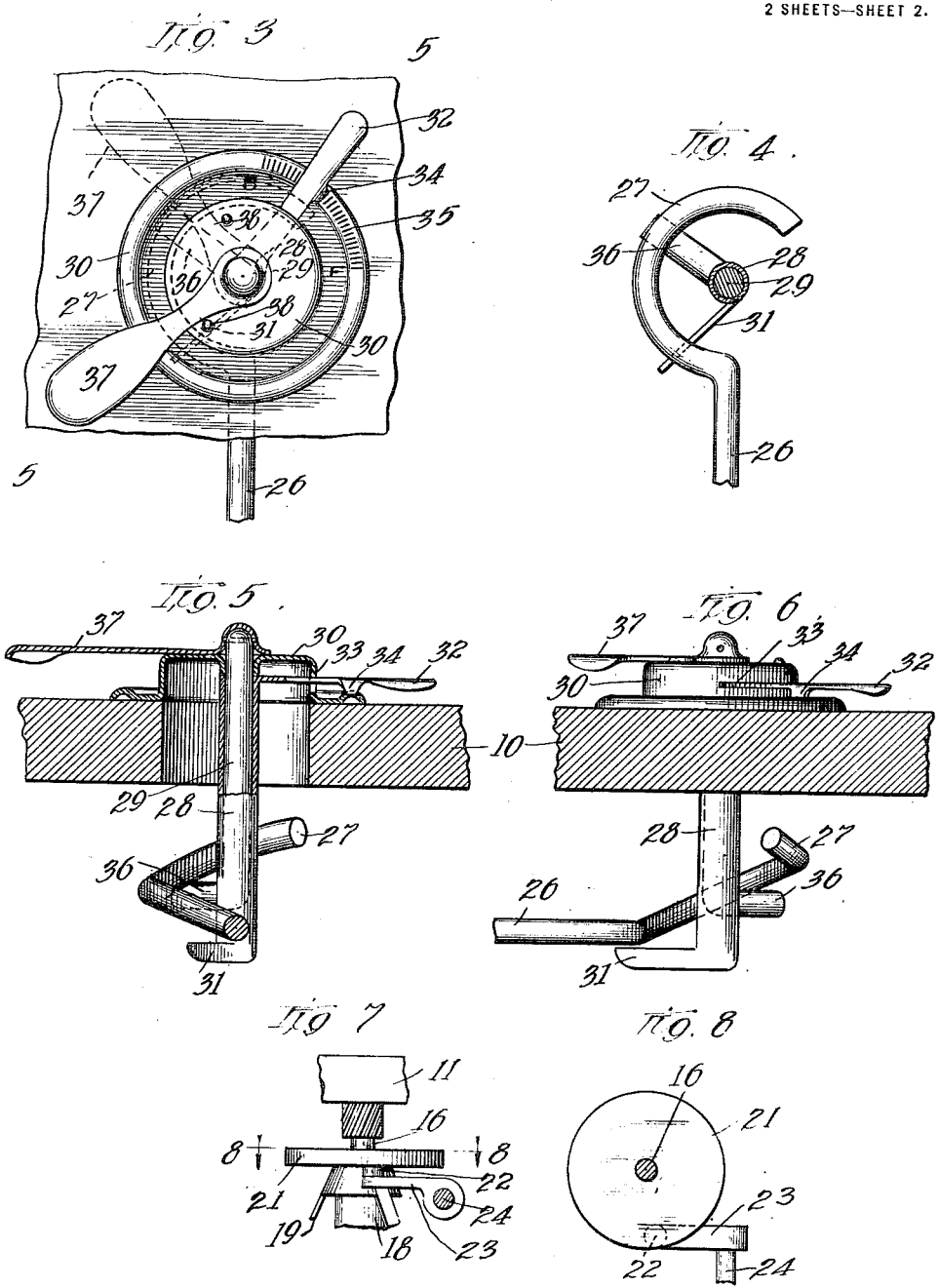

UNITED STATES PATENT OFFICE.

WILLIAM P. DUN LANY, OF CHICAGO, ILLINOIS, ASSIGNOR TO SEARS, ROEBUCK AND COMPANY, OF CHICAGO, ILLINOIS, A CORPORATION OF NEW YORK.

SPEED-REGULATOR AND BRAKE FOR TALKING-MACHINES.

1,284,184.   Specification of Letters Patent.   Patented Nov. 5, 1918.

Application filed October 23, 1916. Serial No. 127,075.

*To all whom it may concern:*

Be it known that I, WILLIAM P. DUN LANY, a citizen of the United States, residing at Chicago, in the county of Cook and State of Illinois, have invented certain new and useful Improvements in Speed-Regulators and Brakes for Talking-Machines, of which the following is a specification.

The object of this invention is to produce novel and improved means for starting, stopping and regulating the speed of the rotary spindle which carries the turntable for the records.

In the accompanying drawings, Figure 1 is a plan view of the motor-supporting board which is embodied in one style of cabinet talking machine, parts of the board being broken out to disclose the motor beneath. Fig. 2 is an enlarged section on line 2—2 of Fig. 1, showing the motor in front elevation. Fig. 3 is a plan view of the manually-operable means for starting, stopping and regulating the motor. Fig. 4 is a sectional plan view of the parts beneath the board. Fig. 5 is a vertical sectional view in the plane of line 5—5 of Fig. 3. Fig. 6 is a vertical section through the board, showing the parts in elevation as seen from the right-hand side of Fig. 3. Fig. 7 is a fragmental detail view illustrating the brake-disk and coöperating brake arm. Fig. 8 is a horizontal sectional view in the plane of line 8—8 of Fig. 7.

I will herein describe in detail the particular embodiment of my invention which I have shown by way of example in the drawings, but without any intention of limiting the invention to this disclosure. The scope of the invention will be pointed out in the appended claims.

Referring to Figs. 1 and 2, 10 indicates a board such as is commonly found in a cabinet talking machine, and to the underside of which the motor is attached. 11 indicates the frame of the motor. The rotary vertical spindle which at its upper end carries the turntable (not shown) for supporting the records, is designated 12 and said spindle is driven by a motor which may be of any desired construction. In the exemplary form herein shown, the motor comprises two spring-driving units 13 which rotate a gear wheel 14, and this gear wheel meshes with a worm 15 on the spindle 12.

A centrifugal governor is connected to the turntable spindle, said governor comprising in the present instance, a vertical shaft 16 geared to said spindle and having thereon a fixed collar 17 and a slidable sleeve 18, said collar and sleeve being connected by leaf springs 19 each carrying a weight 20. To the slidable sleeve 18 is fixed a brake-disk 21. As the speed of the spindle 12 increases, the weights 20 fly outwardly in circles of ever increasing diameter and cause the sleeve 18 and brake-disk 21 to be drawn downwardly in a manner well known.

A brake-shoe 22 carried by an arm 23 contacts the brake-disk 21 and by frictional engagement with the disk is arranged to wholly stop or control the speed of the governor shaft 16 and the spindle 12. The brake-arm 23 is fixed upon one end of a horizontal rock shaft 24 which is mounted in the frame of the motor. On the opposite end of the shaft is fixed an arm 26 which extends toward the forward edge of the board 10 and carries at its extreme forward end a cam 27 which in the present instance is integral with the arm, the end of the rod which forms the arm being inclined and bent into arcuate shape to provide a cam surface. A torsion spring 25 surrounds the shaft 24 and engages a lug on the motor frame and a collar on the shaft, so that said spring tends to rotate the shaft in the direction to depress the arm 26 and withdraw the brake arm 23 to release the brake. 25ª is a stop pin in the frame to limit movement of the brake-arm 23 away from the brake-disk.

The cam 27 is arranged to coöperate with two independently operable lever devices mounted on the board 10, whereby to control the vertical position of the forward end of the arm and thus determine the position of the brake-arm 23. One of the lever devices is used to start and stop the motor and the other to vary the speed thereof. Said lever devices preferably comprise two concentric vertical shafts 28 and 29 which are positioned concentric with the arcuate cam 27 and are independently rotatable. Said shafts pass entirely through the board 10 and are mounted in a suitable bearing member 30 thereon. On the lower end of the tubular shaft 28 is a radial arm 31 underlying the arcuate cam 27. On the upper end of this tubular shaft is fixed an arm 32 which passes out through a slot 33 in the member 30 and is arranged to be manipulated by the operator for varying the speed of the motor. Said arm 32 preferably has a dog 34 engaging in notches 35 in the member 30, there being sufficient spring in the arm to hold the dog in the notch to prevent accidental movement of the arm, but to permit the dog to slip along said notches when it is desired to adjust the arm to a different position.

On the lower end of the shaft 29 is fixed a horizontal radial arm 36 which is located in a higher horizontal plane than the arm 31 and also underlies the arcuate cam 27. On the upper end of the shaft 29 is fixed an arm 37 adapted to be manually swung to start and stop the motor. The arc of swinging movement of the arm 37 is limited by suitable means, in the present instance consisting of two projections 38 on the bearing member 30 forming stops against which the arm 37 is arranged to abut so as to prevent the arm 36 from being moved out from beneath the cam 27. The slot 33 in the bearing member 30 performs, with respect to the arm 32, a function similar to the stops 38 so as to prevent the arm 31 from being moved out from beneath the cam.

The normal position of the stop arm 36, that is when the motor is stopped, is at approximately the midportion of the cam 27, said arm being movable from this position toward the extreme upper end of the cam. The arm thus coöperates with the higher portion of the cam. On the other hand, the regulator arm 31 coöperates with the lower portion of the cam. When the dog 34 of the arm 32 engages one of the notches 35 at the middle of the series of notches, which is the usual position for the arm at normal running speed, the arm 31 preferably lies about midway beneath the ends of its coöperative section of the cam or approximately three-quarters of the length of the cam from the free end thereof. From this position the regulator device comprising the arms 31 and 32 may be adjusted in either direction to obtain a slower or faster speed of the motor. The letters S and F in Fig. 3 indicate the direction to move the arm 32 to effect such slower or faster movement.

In the operation of the device, when the motor is to be started, the lever 37 is moved from the full line to the dotted line position indicated in Fig. 3, which movement carries the arm 36 from its normal position shown in Figs. 5 and 6 to a position beneath the highest part of the cam 27. The weight of the arm 26 and the force of the spring 25 thereon cause said arm to descend as the arm 36 is moved along the cam and such descent of the arm 26 lowers the brake arm 23 to relieve the friction of the brake-shoe 22 on the brake-disk 21, whereupon the motor will start. As the speed of the motor increases, the weights 20 of the governor in their centrifugal flight draw the brake-disk 21 down until it contacts with the brake-shoe 22, when further increase in speed will be prevented. It will thus be seen that the position to which the arm 26 may descend will control the position of the brake-arm and thus accurately determine the speed which the motor and the turntable spindle may attain. The regulator device (comprising the parts 28, 31 and 32) constitutes adjustable means for controlling the limit to which the arm 26 may descend to attain the function just mentioned. When the start-and-stop device (comprising parts 29, 36 and 37) is moved to start the motor, the arm 26 descends until the cam 27 rests on the regulator arm 31. If it be desired to increase the motor speed, the arm 31 is adjusted to lie beneath a higher part of the cam 27, so as to permit further descent of the arm 26; and if the speed of the motor is to be decreased, said arm is moved to underlie a lower part of its cam.

I claim as my invention:

1. A speed regulator or brake comprising, in combination, a horizontal rock shaft, a brake-arm fixed thereon, a cam-arm also fixed to said shaft, an arcuate cam mounted on one end of said cam-arm, and a manually-operable lever device comprising a vertical shaft positioned concentric with said cam, an arm fixed on the lower end of said shaft and coöperating with said cam to control the position of said cam-arm, and another arm fixed on the upper end of said vertical shaft and adapted to be grasped by the operator.

2. A speed regulator and brake comprising, in combination, a controlling element provided with a cam, two concentric rotary shafts, two arms fixed on two adjacent ends of the respective shafts in different planes and adapted to coöperate with said cam, and means for independently rotating said shafts to control the position of the arms carried thereby.

3. A speed regulator and brake comprising, in combination, a controlling element carrying an arcuate cam, and manually-operable controlling means comprising two concentric shafts rotatably mounted concentric with said arcuate cam, two radial arms fixed on the adjacent ends of the respective shafts, the position of said radial arms determining the amount of movement of the first mentioned arm, and means for independently rotating said shafts.

4. A speed regulator and brake having, in combination, a brake-operating element provided with an arcuate cam, a tubular shaft rotatably mounted concentric with said cam, a radial arm fixed on said shaft and arranged to coöperate with said cam, said brake element tending to move in one direction and said arm determining the limit of such movement, a second shaft rotatably mounted within said tubular shaft, a radial arm fixed on the second shaft in a plane spaced from the first mentioned radial arm and arranged to coöperate with said cam to control the position of said element, and means for independently rotating said shafts.

5. A speed regulator and brake comprising, in combination, two concentrically mounted and independently rotatable controlling devices, and a brake controlling element provided with an arcuate cam positioned concentric with said devices, one of said devices controlling the position of said element to move the brake into start or stop position, and the other of said devices determining the limit of movement of said element to set the brake in definite speed limiting position.

6. A combined speed regulator and brake comprising, in combination, a controlling element tending to move in one direction, manually-operable means normally preventing such movement and shiftable to allow such movement, and independently adjustable means having an independent sliding engagement with said element to limit such movement when allowed by the first mentioned means.

7. A combined speed regulator and brake comprising, in combination, a controlling element tending to move in the direction to permit operation of the device to be controlled, a pivoted member normally holding said element in position to prevent such operation, said member being swingable with reference to said controlling element to permit said element to move in accordance with its tendency so as to start operation of the device to be controlled, and adjustable means arranged to limit such movement of said element and having an independent engagement therewith for controlling and varying the speed at which the device to be controlled may run.

8. A combined speed regulator and brake comprising, in combination, a controlling element which normally occupies a position to prevent operation of the device to be controlled, means for effecting movement of said element to permit operation of such device, and means having an independent sliding engagement with said element and arranged to limit such movement of said element for controlling the speed at which such device may run.

9. A combined speed regulator and brake comprising, in combination, a centrifugal governor, a brake element movable by said governor, a coöperating brake element, a controlling element for controlling the position of the last mentioned brake element, said controlling element normally occupying a position to hold said brake elements together so as to wholly stop the governor, means for effecting movement of said controlling element to permit the governor to run, and means having an independent sliding engagement with said element for limiting such movement of said element to control the speed at which the governor may run.

10. A combined speed regulator and brake comprising, in combination, a governor, a controlling element, two coacting brake elements, one of which is movable by the governor and the other of which is movable by said controlling element, said controlling element normally occupying a position with the brake applied to wholly stop the governor, manually-operable means for effecting movement of said controlling element to permit the governor to start to run, and independently operable manual means having an independent sliding engagement with said element to limit such movement of said element, the last mentioned means being adjustable, whereby the speed at which the governor may run may be controlled and varied at will.

11. A speed regulator or brake comprising, in combination, a governor, a controlling arm operatively associated with the governor to control the speed of the latter, and a shaft having two radial arms fixed thereon, one of said arms coöperating with said controlling arm to swing the latter and the other arm being adapted to be manipulated by the operator.

12. A combined speed regulator and brake comprising, in combination, a governor, a controlling element operatively associated with said governor to control the latter, and two independently operable devices having an independent sliding engagement with said controlling element for positioning the latter.

13. A combined speed regulator and brake comprising, in combination, a governor, a controlling arm operatively associated with said governor to control the latter, and two independently operable devices having an independent sliding engagement with said controlling arm for positioning the latter, one of said devices being arranged to control said arm to start and stop the governor, and the other of said devices being arranged to control the position of said arm to regulate the speed of the governor.

14. A combined speed regulator and brake comprising, in combination, a governor, a controlling element operatively associated with said governor for controlling the latter, a cam carried by said element, and two manually operable devices adapted to engage said cam and arranged to be independently moved to control the position of said element, one of said devices acting to effect the starting and stopping of the governor and the other of said devices acting to control the speed of the governor through the medium of said element.

15. A combined speed regulator and brake comprising, in combination, a governor, a controlling element operatively associated with said governor for controlling the latter, an arcuate cam carried by said element, and two manually-operable devices mounted concentric with said arcuate cam and independently rotatable, one of said devices coöperating with said cam to control the position of said element for starting and stopping the governor and the other of said devices being adapted to control the position of said element for regulating the speed of the governor.

16. A combined speed regulator and brake comprising, in combination, a governor, a controlling element operatively associated with said governor for controlling the latter, said element being provided with an arcuate cam and tending to move in one direction, and two manually-operable devices mounted concentric with said arcuate cam and independently rotatable, one of said devices being adapted to control the position of said element for starting and stopping the governor, and the other of said devices being adapted to limit the movement of said element as effected by the first mentioned device for regulating the speed of the governor.

17. A combined speed regulator and brake comprising, in combination, a governor, a swinging arm tending to move in one direction and provided with a cam to move therewith, and two manually-operable devices comprising parts to be grasped by the operator and other parts to engage said cam independently of each other, one of said devices being arranged to control the position of said arm for starting and stopping the governor, and the other of said devices being arranged to limit the movement of the arm for regulating the speed of the governor.

18. A combined speed regulator and brake comprising, in combination with a device to be controlled, a rock shaft, a brake element and a controlling arm on said shaft, and two independently rotatable members operable to vary the position of said brake member with reference to said device to be controlled.

In testimony whereof, I have hereunto set my hand.

WILLIAM P. DUN LANY.